United States Patent
Alamparambil

(10) Patent No.: US 6,559,844 B1
(45) Date of Patent: May 6, 2003

(54) METHOD AND APPARATUS FOR GENERATING MULTIPLE VIEWS USING A GRAPHICS ENGINE

(75) Inventor: Jimmy C. Alamparambil, Brampton (CA)

(73) Assignee: ATI International, SRL, Christ Church (BB)

( * ) Notice: Subject to any disclaimer, the term of this patent is extended or adjusted under 35 U.S.C. 154(b) by 0 days.

(21) Appl. No.: 09/305,401

(22) Filed: May 5, 1999

(51) Int. Cl.[7] .............................................. G06T 17/00
(52) U.S. Cl. ...................................................... 345/427
(58) Field of Search ............................... 345/418, 419, 345/427, 420, 423, 424, 426

(56) References Cited

U.S. PATENT DOCUMENTS

| | | | |
|---|---|---|---|
| 5,917,940 A | 6/1999 | Okajima et al. | |
| 5,933,127 A | 8/1999 | DuBois | |
| 5,982,375 A | * 11/1999 | Nelson et al. | 345/419 |
| 6,005,607 A | 12/1999 | Uomori et al. | |
| 6,044,408 A | * 3/2000 | Engstrom et al. | 709/302 |

OTHER PUBLICATIONS

Foley et al, "Computer Graphics: Principles and Practice", 1996, pp. 873–874.*

* cited by examiner

Primary Examiner—Cliff N. Vo
(74) Attorney, Agent, or Firm—Vedder, Price, Kaufman and Kammholz

(57) ABSTRACT

Multiple graphic images are generated simultaneously. An object or a polygon is received by a 3D graphics pipeline whereby a first stage of the pipeline performs a world transform on the modeling space of the object or polygon. An object culling is performed on the world space to eliminate objects not within view. Lighting is applied to the object as appropriate. Two view transforms are performed in parallel. Backface culling is applied to the resulting data. A single backface culling algorithm can be applied to both of the view transform scenes. A projection transformation is applied to those objects remaining following the backface culling. The first and second view transformed scenes are rendered in order to produce a first target image and a second target image respectively.

29 Claims, 4 Drawing Sheets

METHOD AND APPARATUS FOR GENERATING MULTIPLE VIEWS USING A GRAPHICS ENGINE

FIELD OF THE INVENTION

The present invention generally relates to generating multiple views using a video graphics engine, and more specifically relates to generating stereoscopic views using a video graphics engine.

BACKGROUND OF THE INVENTION

Video graphics systems that are capable of synthesizing three-dimensional images onto two-dimensional display devices such as a traditional computer monitor are known. By providing lighting, shading, texture, and Z-data, it is possible to synthesize three-dimensional images on a two-dimensional device.

The number of calculations needed in order produce synthesized three-dimensional images is large. When 3-D graphics is used in conjunction with interactive systems, such as video games, the graphics calculations often require more processing capability than is generally available with today's modern video processors.

Stereoscopic images are dual images that are viewed exclusively by either the left eye or the right eye in order to provide an enhanced three-dimensional imaging view. A number of stereoscopic viewing devices exist. One such stereoscopic viewing device requires the user to wear a pair of display glasses whereby the left eye and right eye are sequentially allowed to view a computer monitor. The viewing of the monitor is controlled by a signal received at the display glasses indicating whether a right eye frame or a left eye frame is currently being displayed on the monitor. When a left-eyed frame is being displayed, the signal will indicate that the left-eye lens of the viewing device is to be transparent and the right-eyed lens is to be opaque. In a similar manner, the right eye would be transparent, and the left eye opaque, in response to the signal indicating a right-eye signal.

In order to maintain a quality image, it is desirable for stereoscopic images to be generated at twice the rate of that needed for normal synthesized 3-D view. In other words, if a monitor's refresh rate is 75 hertz, normal 3-D imaging would require a screen refresh rate of 75 frames per second, however, to maintain the same quality of image using stereoscopic 3-D imaging, it would be necessary to generator 75 frames per second for the left eye, and 75 frames per second for the right eye. This rate of frame update further tests the limits of current video processing technology.

Therefore, a method and apparatus for generating multiple frame images that overcomes these issues would be desirable.

DETAILED DESCRIPTION OF THE DRAWINGS

In accordance with a specific embodiment of the present invention, an object or a polygon is received by a video pipeline whereby a first stage of the pipeline performs a world transform on the modeling space of the object or polygon. Next, object culling is performed on the world space in order to eliminate those objects not within the view to be rendered. Next, lighting is applied to the object as appropriate. Next, two view transforms are performed in parallel. Next, backface culling is applied to the result of the two view transforms. A single backface culling algorithm can be applied to each of the resulting view transforms. Next, a projection transformation is applied to the remaining objects. In a further step, the first and second views are rendered in order to produce a first target image and a second target image. By limiting parallel operations to only those operations that occur independent of one each other, space and time savings can be realized using the present invention.

The present invention is better understood with reference to specific embodiments. In order to facilitate discussions of the present invention, the objects of FIGS. 1 and 2 will be discussed within the context of the flow of FIG. 3. The method of FIG. 3 is generally implemented by a video graphics engine. In accordance with one embodiment of the present invention, the method of FIG. 3 is implemented by a pipeline associated with the graphics engine.

In order to generate a 3D effect using stereoscopic images, it is necessary to generate two different views having slightly displaced view points. Typically, the view points will be displaced by a distance that approximates the separation of the eyes. The two views of a Stereoscopic image are generally generated by making two complete passes through a video engine. In accordance with the present invention, only one pass through the video engine occurs in order to generate both views. This is accomplished with parallel view transform and rendering engines. Because the two views are very similar, it is possible to optimize the video engine to generate both stereoscopic views in a single pass with a minimal increase in hardware cost.

Because the method of FIG. 3 is also representative of a pipeline structure for implementing an embodiment(s) the present invention. Each step of FIG. 3 may be referred to as a step, a pipeline stage, or just a stage. At pipeline stage 301, an object or a polygon is received. For a 3-D graphics accelerator, a specific number of polygon vertices in their modeling space are provided to a graphics engine in order to ultimately draw the polygon or the object on the screen after modifying various parameters. For example, each triangle 111 of FIG. 1 has three vertices. At step 301, the modeling space of the object or polygons is transformed into world space to provide a world transformed object.

Figure 1:
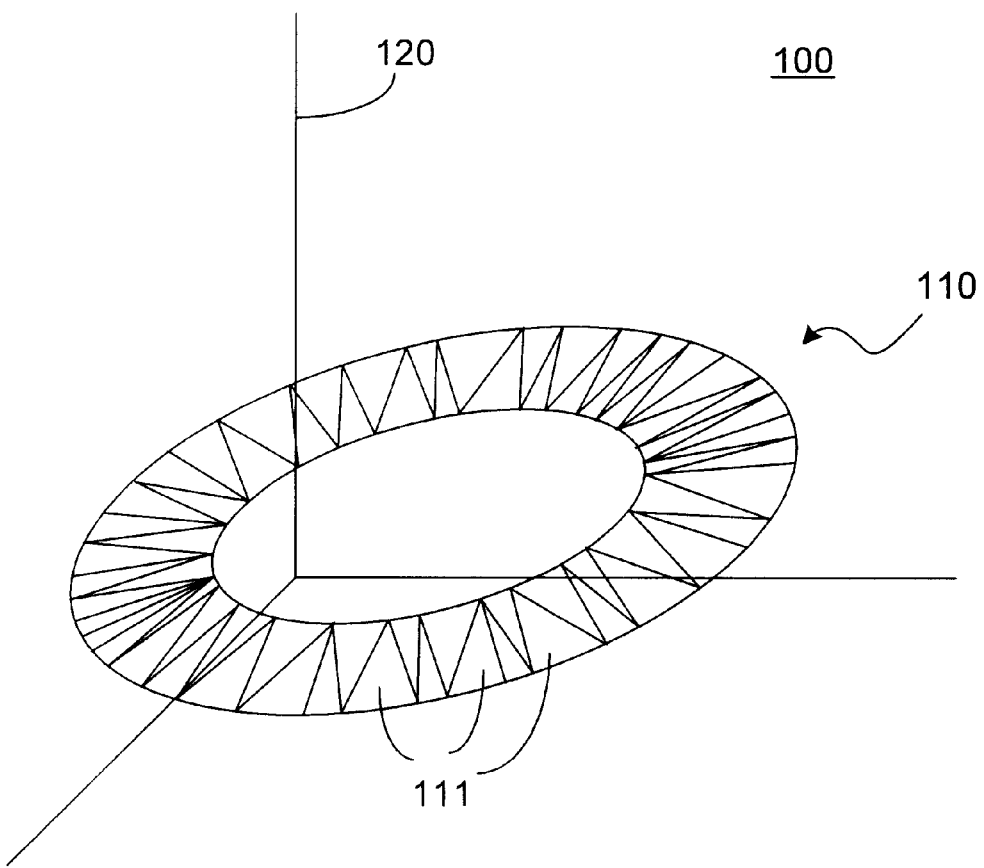
FIG. 1 illustrates an object in modeling space.
Figure 2:
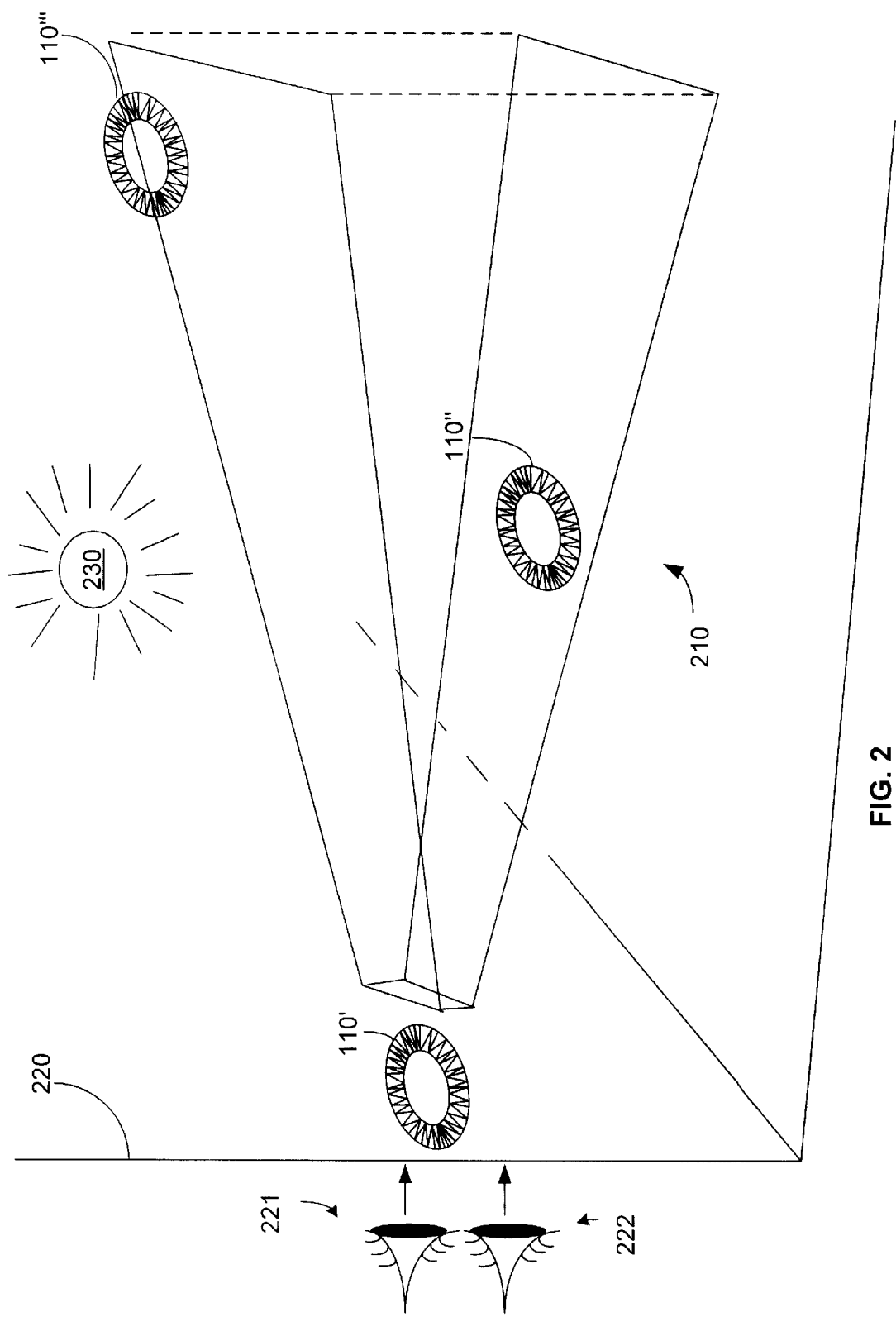
FIG. 2 illustrates the object mapped into world space.
Figure 3:
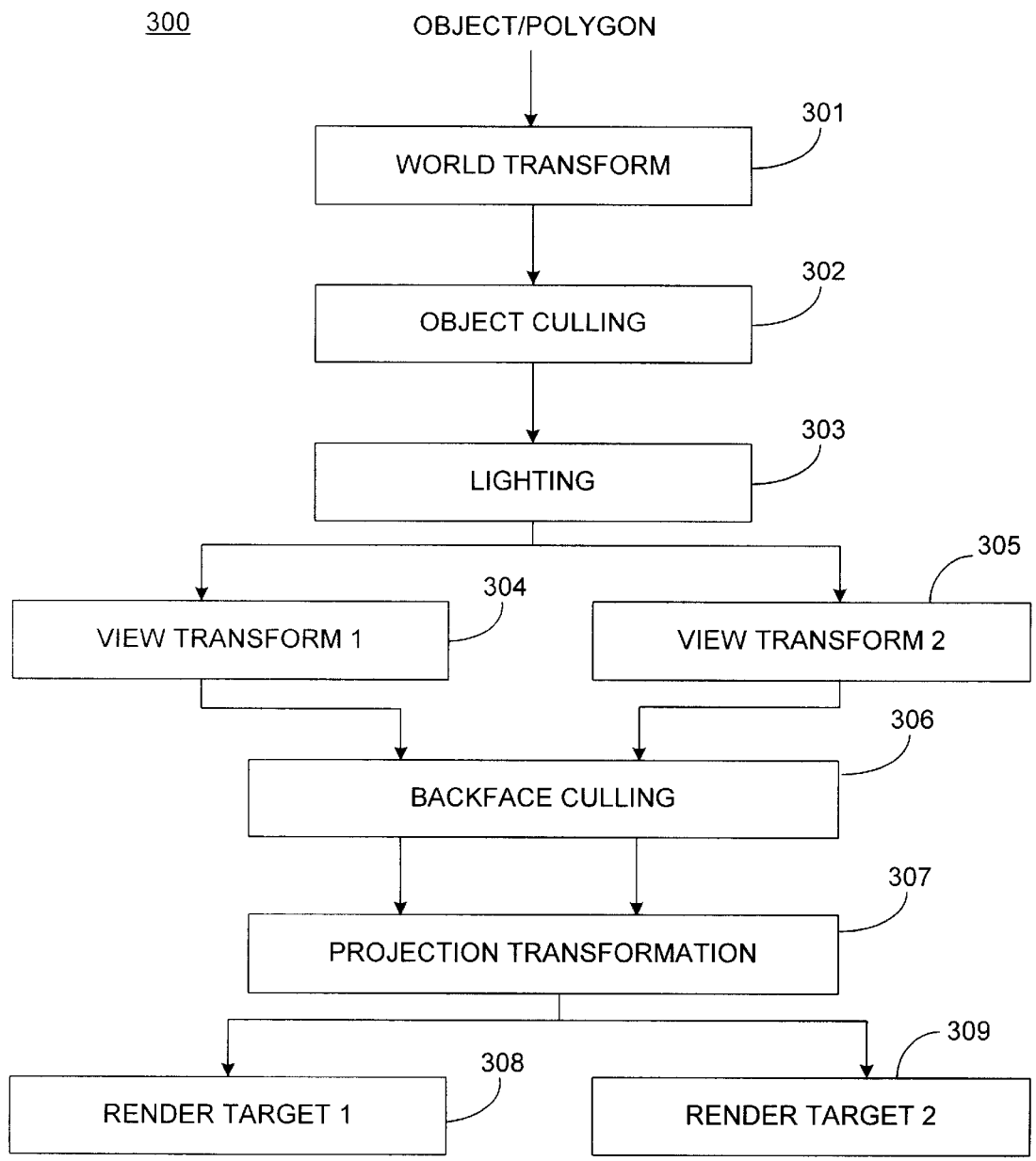
FIG. 3 illustrates in flow diagram form a proposed pipeline structure in accordance with the present invention.

The concept of modeling space and world space is better understood with reference to FIGS. 1 and 2. FIG. 1 illustrates modeling space for the object 110. The object 110 further comprises individual polygons 111. In general, the polygons 111 are made up of triangles having unique vertices. The coordinate system 120 of the object 110 in FIG. 1 is referred to as its modeling space. An objects modeling space is used to initially create of define a specific object, and is not representative of where an object is actually located relative to other objects, or to where it is to be displayed upon a screen.

FIG. 2 illustrates a world space coordinate system 220, which specifies how objects are positioned with reference to one another. Within the world space, the actual spatial relationships of all objects is represented. In FIG. 2, three of the objects 110, of FIG. 1, have been transformed from their modeling space into world space. The first object labeled as 110' is illustrated as the left-most object. The second object labeled as 110" is the center object. The third object created from the object 110 is labeled as 110''', and is the right most object. The actual relationship of the objects 110', 110", and 110''' to each other is used to display the shapes on a display device.

Next, at a step or pipeline stage 302, an object culling operation occurs. An object culling operation removes those objects within the world space that will not ultimately be displayed on the display device. Generally, object culling removes items that are not within the current view. During a normal 3-D graphics operation, where there is a single view, a single frustum is used to cull objects not within the viewable space. Therefore, objects outside the frustum, which includes objects too close to the view point and too far from the view point, are removed from processing. For example, in FIG. 2 the frustum 210 includes the area within the structure 210, but not extending to the right of the frustum 210, nor to the left. Therefore, in the specific example of FIG. 2, the object 110' will be culled because it is entirely outside the actual frustum 210. However, object 110''' is partially within the frustum 210, and thereby maintained.

In the embodiment illustrated, a single object-culling step 302 is utilized in order to cull objects for both view points 221 and 222. This is accomplished by performing a union of frustums created by the two view points 221 and 222. Therefore, frustum 210 is slightly larger than the individual frustums of views 221 and 222 because frustum 210 represents a union of these views. While the use of the union of the two frustums results in more objects being maintained, the number of additional objects included as a result of using the union is minimal as compared to the bandwidth saving realized by being able to perform a single object culling at step 302. Therefore, being able to perform a single object culling step allows the object culling procedure to occur for both views in the same amount of time as it would normally take to cull for one view.

At step 303, lighting is applied to the remaining objects in the world space. FIG. 2 illustrates a lighting source 230. For one class of 3-D operations, the lighting of the objects is not view-dependent. As a result, it is possible to perform the lighting calculations just once regardless of view. For example, the lighting can be applied to each object based on its vertices just once, since lighting depends upon the position of the light source in the world space, and not upon the view point viewer. Therefore, it is possible to perform a single lighting step for both views. In this manner, it takes no more time to apply lighting to two stereoscopic images than for one normal image.

Steps 304 and 305 of the pipeline occur simultaneously in accordance with the present invention. Each of steps 304 and 305 perform a view transform operation. As a result of the view transform steps 304 and 305, the world space containing the objects is converted into a camera coordinate space. By performing the view transform operations 304 and 305 simultaneously, it is possible to generate the views in approximately the same amount of time as a single view transformed view would be generated using prior art implementations.

In a different embodiment of the present invention, it is possible to save the world coordinate information from the pipeline step 303 and perform the steps 304 and 305 sequentially, whereby during a first pass the left-eye transform will occur, and during a second pass a right-eye transform will occur. While this implementation will save the time associated with performing the steps 301–303 of the present application, it would require twice as much time in order to generate the view transformed views themselves.

A backface culling operation occurs at step 306. In general, separate backface culling operations will occur on each of the view transformed vies from step 304 and step 305. Performing separate backface culling operations is preferred because a face of an object that is visible from a first view may not be visible from a second view because it faces away from it. Therefore, in order to maintain maximum 3-D effects, it is desirable to use separate view information when performing a backface culling operation at step 306. However, where the quality of the image is not of utmost concern, or is otherwise deemed not necessary, it is possible to perform the backface culling on a union of the two views in the same manner as the object culling was original performed. Such a single backface culling operation can be performed prior to the view transform steps 304 and 305.

At step 307, a projection transformation is performed in order to provide a screen coordinate system. The projection transformation provides sizing information for each object in order to give the perception of 3-D distance on a 2-D display. For example, objects having the same physical size are drawn to different sizes when one of the objects is further away from the view point than the other object. In general, the same projection transformation algorithm will be applied to both view transformed views. In another embodiment, the projection transformation can occur prior to backface culling.

Pipeline stages 308 and 309 provide rendered images to the display devices (not shown). The actual screen coordinates provided from the projection transformation step 307 are provided to pipeline stages 308 and 309. Based on the screen coordinate information, steps 308 and 309 are capable of rendering the first image and the second image to the first and second target or display device. The first and second target may be a single screen with alternating frames for right and left eye information, or a set of stereoscopic viewing goggles whereby left-eye image is continuously provided to the left eye of the goggles and the right-eye image is continuously provided to the right eye of the goggles. In addition, many other types of other stereoscopic display devices are capable of being used in accordance with the present invention.

Figure 4:
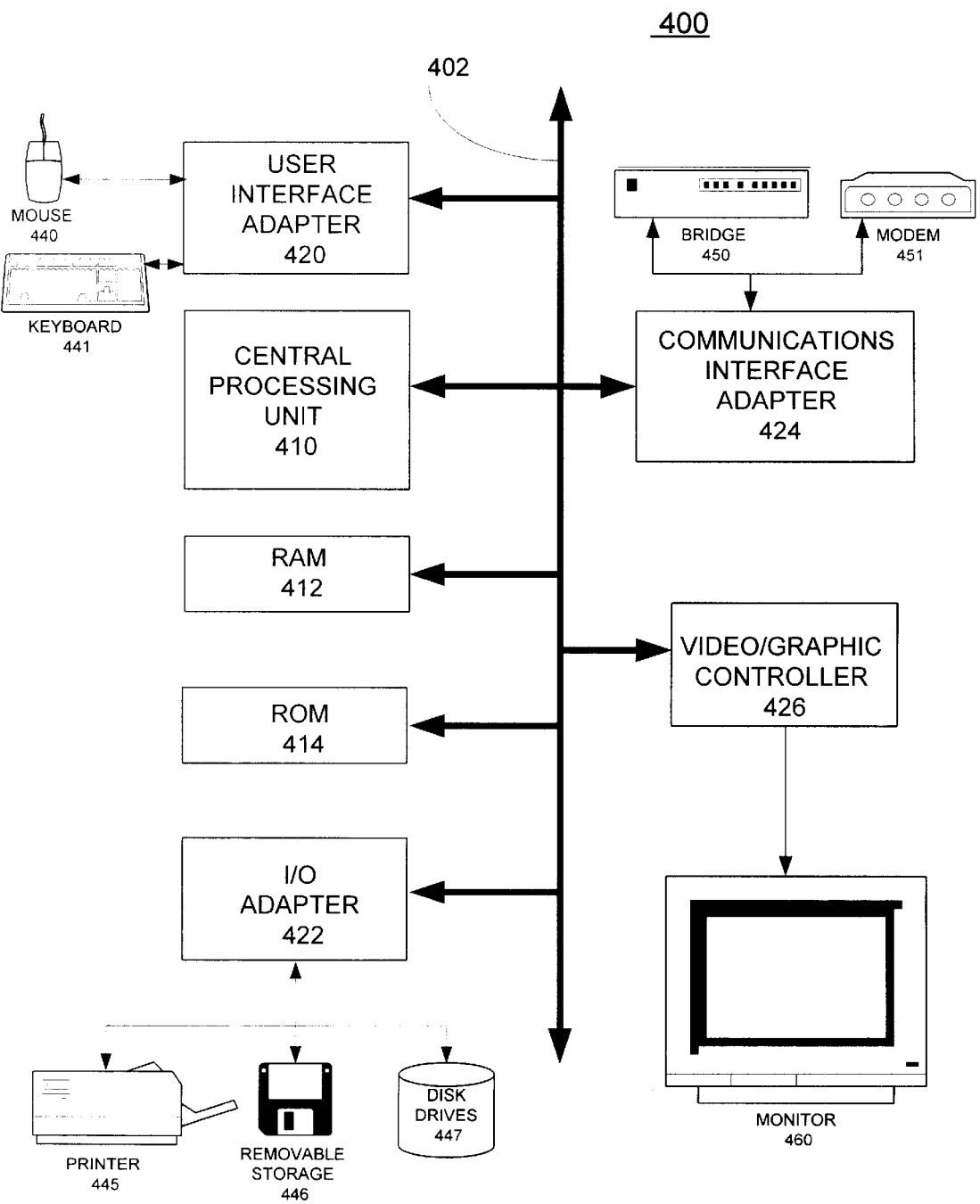
FIG. 4 illustrates a system capable of implementing specific embodiment in accordance with the present invention.

FIG. 4 illustrates a data processing system 400 such as may be used to incorporate or implement the present invention. The system of FIG. 4 includes a central processing unit (CPU) 410 which may be a conventional or a proprietary processing unit. The CPU 410 and a number of other units are interconnected through a system bus 402. The other units includes random access memory 412, read-only memory 414, and an input/output (I/O) adapter 422 for connecting peripheral devices, a user interface adapter 420 for connecting user interface devices, a communications adapter 424 for connecting system 400 to a data processing network, and a video graphics controller 426 for displaying video and graphics information.

The I/O adapter is further connected to disk drive 447, printer 445, removable storage device 446, and tape units (not shown). Other storage devices may also be interfaced to the bus 402 through the I/O adapter 422.

The user interface adapter 420 is connected to a keyboard device 441 and a mouse 440. Other user interface devices such as a touch screen device (not shown) may also be coupled to the system bus 402 through the user interface adapter 420.

A communications adapter 424 is connected to bridge 450 and/or modem 451 as well as any other networking devices.

A video graphics controller 426 connects to the system bus 402 to a display device 460. It will be understood by one skilled in the art that the video graphics controller 426 will have an associated video graphics memory which is either a dedicated video memory, or a video memory shared with the system 400. In a specific implementation, the pipeline structure of FIG. 3 will implemented on the video graphics controller 426. In response to system commands over the bus 402, the video graphics controller 426 will generate stereoscopic images on a display device such as the monitor 460.

It should be further understood that specific steps of FIG. 3 may actually be implemented in hardware and/or in software. For example, the object culling of step 302 can be performed by hardware engine of the graphics controller 426, or the steps can be performed in firmware, such as in microcode, executed on the processing engine associated with the controller 426 or it may even be performed fully in software on the CPU 410. In general, a system for rending multiple views of an object may include a processing module and memory. The processing module may be a single processing device or a plurality of processing devices. Such a processing device may be a microprocessor, microcontroller, digital signal processor, microcomputer, portion of the central processing unit, state machine, logic circuitry, and/or any device that manipulates signals (e.g., analog or digital) based on operational instructions. The memory may be a single memory device or a plurality of memory devices. Such a memory device may be a read-only memory, random access memory, floppy disk memory, magnetic tape memory, erasable memory, portion of system memory, and/or any device that stores operational instructions in a digital format. Note that when the processing module implements one or more of its functions via a state machine or logic circuitry, the memory storing the corresponding operational instructions is embedded within the circuitry comprising the state machine and/or logic circuitry.

It should be apparent that the present invention provides the advantage of allowing parallel processing to occur in order to increase performance where multiple views of an object are to be provided. In addition, the present invention results in less data being sent down the associated pipelines because one pass of data creates two rendered views, this increases the bandwidth of the system. In addition, the implementation of the present invention is simpler in that a second pass is not necessary in order to provide a second view of the images. By performing common steps once, system bandwidth is also saved.

It should now be understood that the present invention has been put forth with reference to specific embodiments. Other embodiments of the present invention are also likely and would be anticipated by the present invention. For example, other possible ways of using parallel processing to pipeline would be to perform a top and a bottom view, or two side views of an object concurrently. In addition, it would be possible to render alternate horizontal or vertical scan lines using concurrent rendering engines to render odd and even lines. In addition, the actual location of the pipeline or steps can vary. Specifically, the projection transformation stage 307 can occur prior to the view transformation stages 304 and 305. In addition, the present invention can be applied to non-stereoscopic applications where two or more closely related views are needed.

I claim:

1. A system for rendering multiple views of an object, the system comprises:

a first pipeline stage having an input to receive a first object having a set of vertices, and an output to provide a world transformed object after performing a world transform on the first object;

a second pipeline stage having an input coupled to the output of the first pipeline stage to receive a representation of the world transformed object, the second pipeline stage having an output to provide a first view transformed object after performing a first view transform on the representation of the world transformed object; and a third pipeline stage in parallel with the second pipeline stage having an input coupled to the output of the first pipeline stage to receive the representation of the world transformed object, the third pipeline stage having an output to provide a second view transformed object after performing a second view transform on the representation of the world transformed object.

2. The system of claim 1, wherein the first view transform is for a left eye view.

3. The system of claim 2, wherein the second view transform is for a right eye view.

4. The system of claim 1, wherein the first, second and third pipeline stages are associated with a video graphics adapter.

5. The system of claim 1, wherein the first, second and third pipeline stages are associated with a computer system.

6. The system of claim 1 further comprising:

a fourth pipeline stage coupled to the output of the second pipeline stage to receive the first view transformed object, the fourth pipeline stage having an output to provide a first rendered image of the first view transformed object; and a fifth pipeline stage coupled to the output of the third pipeline stage to receive the second view transformed object, the fifth pipeline stage having an output to provide a second rendered image of the second view transformed object.

7. The system of claim 6, wherein the first rendered image and the second rendered image are provided substantially simultaneously.

8. The system of claim 7, wherein substantially simultaneously includes adjacent frames of data.

9. The system of claim 7, wherein substantially simultaneously includes concurrently displayed frames of data.

10. A method of transforming graphics data, the method comprising the steps of:

simultaneously performing a first view transform and a second view transform on a first object to provide a first view transformed object and a second view transformed object;

rendering a first view based on the first view transformed object; and simultaneously rendering a second view based on the second view transformed object.

11. The method of claim 10 further comprising:

performing a world transform on a second object to provide the first object.

12. The method of claim 11 further comprising the step of:

performing an object culling operation prior to providing the first object, wherein the first object is based on the object culling operation.

13. The method of claim 12, wherein the object cull comprises a single culling operation based on a first view location and a second view location.

14. The method of claim 12, further comprising the step of:

applying a lighting operation prior to providing the first object, wherein the first object is based on the lighting operation.

15. The method of claim 10 further comprising:

performing a backface culling operation prior to the step of simultaneously performing a first view transform and a second view transform.

16. The method of claim 10 further comprising:

performing a backface culling operation based on a first view point and a second backface culling operation based on a second view point.

17. The method of claim 16, wherein the first and second culling operations are a common culling operation performed based on both the first view point and the second view point.

18. The method of claim 10, further comprising the step of:

performing a projection transform based on data from the first view translated object and the second view translated object.

19. The method of claim 18, wherein the projection transform is a common projection transform.

20. A method of transforming graphics data, the method comprising the steps of:

receiving an object having a plurality of vertices;

performing a culling operation on the object;

simultaneously performing a first view transform and a second view transform on the object after performing the culling operation.

21. A method of rendering data, the method comprising the steps of:

receiving an object having a polygon, the polygon being within a first view and outside a second view;

performing a culling operation based on a first view and a second view, wherein the first polygon is maintained because it is within the first view;

performing a view transform of the object based on the first view; and simultaneously performing a view transform of the object based on the second view.

22. A system for rendering multiple views of an object, the system comprises:

a processing module; and memory operably coupled to the processing module, wherein the memory stores operational instructions that cause the processing module to: (a) simultaneously perform a first view transform and a second view transform on a first object to provide a first view transformed object and a second view transformed object; (b) render a first view based on the first view transformed object; and (c) simultaneously render a second view based on the second view transformed object.

23. The system of claim 22, wherein the memory further comprises operational instructions that cause the processing module to perform a world transform on a second object to provide the first object.

24. The system of claim 23, wherein the memory further comprises operational instructions that cause the processing module to perform an object culling operation prior to providing the first object, wherein the first object is based on the object culling operation.

25. The system of claim 23, wherein the memory further comprises operational instructions that cause the processing module to perform the object cull using a single culling operation based on a first view location and a second view location.

26. The system of claim 23, wherein the memory further comprises operational instructions that cause the processing module to apply a lighting operation prior to providing the first object, wherein the first object is based on the lighting operation.

27. The system of claim 22, wherein the memory further comprises operational instructions that cause the processing module to perform a backface culling operation prior to the step of simultaneously performing a first view transform and a second view transform.

28. The system of claim 22, wherein the memory further comprises operational instructions that cause the processing module to perform a backface culling operation based on a first view point and a second backface culling operation based on a second view point.

29. The system of claim 23, wherein the memory further comprises operational instructions that cause the processing module to perform a projection transform based on data from the first view translated object and the second view translated object.

* * * * *